US008646265B2

(12) United States Patent
Abdalla

(10) Patent No.: US 8,646,265 B2

(45) Date of Patent: Feb. 11, 2014

(54) HYDRAULIC POWER APPARATUS

(76) Inventor: John A. Abdalla, Richmond, OH (US)

(*) Notice: Subject to any disclaimer, the term of this patent is extended or adjusted under 35 U.S.C. 154(b) by 361 days.

(21) Appl. No.: 13/230,200

(22) Filed: Sep. 12, 2011

(65) Prior Publication Data

US 2012/0060490 A1 Mar. 15, 2012

Related U.S. Application Data

(60) Provisional application No. 61/403,401, filed on Sep. 15, 2010.

(51) Int. Cl.
*F16D 31/02* (2006.01)
*F03B 7/00* (2006.01)

(52) U.S. Cl.
USPC .................................. 60/398; 60/639; 60/495

(58) Field of Classification Search
USPC ............................ 60/517, 398, 639, 495–496
See application file for complete search history.

(56) References Cited

U.S. PATENT DOCUMENTS

| | | | | | |
|---|---|---|---|---|---|
| 4,296,602 | A * | 10/1981 | Hales et al. | ...................... | 60/398 |
| 4,309,154 | A * | 1/1982 | Daddario | ...................... | 417/337 |
| 4,317,046 | A * | 2/1982 | Holmberg | ...................... | 290/1 R |
| 4,385,497 | A * | 5/1983 | Scott | ...................... | 60/639 |
| 2011/0173976 | A1* | 7/2011 | Meadon et al. | ................. | 60/639 |

* cited by examiner

*Primary Examiner* — Hoang Nguyen
(74) *Attorney, Agent, or Firm* — Wood, Herron & Evans, LLP

(57) ABSTRACT

An apparatus and method for providing hydraulic power to a turbine generator. A neutrally buoyant wheel having radially opposed first and second containment chambers is suspended in a reservoir containing a liquid. One chamber is filled with the liquid and the wheel rotated so that the chamber containing the liquid is in an uppermost position, which due to the configuration of the wheel results in the chamber that does not contain liquid being in a lowermost position. The uppermost chamber is coupled to an input port of the hydraulic turbine, the lowermost chamber coupled to an output port of the hydraulic turbine, and the liquid allowed to flow from the uppermost chamber to the lowermost chamber through the hydraulic turbine. After the liquid has drained from the uppermost chamber and filled the lowermost chamber, the wheel is rotated 180 degrees and the process repeated.

20 Claims, 17 Drawing Sheets

HYDRAULIC POWER APPARATUS

CROSS-REFERENCE TO RELATED APPLICATION

This application is related to and claims the filing benefit of U.S. Provisional Application Ser. No. 61/403,401 to John Assif Abdalla entitled "Weightless Water Wheel" filed on Sep. 15, 2010, which application is incorporated by reference in its entirety herein.

BACKGROUND

The present invention relates generally to hydroelectric turbines, and more particularly, to methods and structures for providing liquids to power hydroelectric turbines.

Hydroelectric power is an efficient, renewable, and abundant power source that is relied upon in many parts of the world. These desirable features have led to the development of reliable hydroelectric generators. However, these hydroelectric generators typically require a supply of water having a relatively high pressure in order to function efficiently. This requirement for high pressure is typically satisfied by constructing dams which are high enough so that the pressure of the water at the base of the dam is sufficient to efficiently power the hydroelectric turbine.

However, in many instances constructing additional dams to store the water necessary to power these hydroelectric generators is not practical due to the nature of the water source. For example, the grade of the available terrain may be too shallow to allow a dam of sufficient height to develop the required pressure and motive flow for the efficient operation of a hydroelectric turbine. In other situations, there may not be a stream or river having sufficient volume of flow to fill a reservoir formed behind a dam, or geological conditions may be such that a large dam could not be supported by the local bedrock. In addition, the ecological impact or economic expense of constructing such a dam may be prohibitive.

In another commonly encountered situation, it may be desirable to transfer water to a distant or elevated location. However, due to the number and/or size of electrical pumps needed to transfer the water to the distant or elevated location, the transfer of water may consume a considerable amount of energy.

In yet another situation, although an existing dam and hydroelectric generator system may be available, the demands on the power generated and/or water supply for other purposes (such as irrigation during an extended drought) may exceed supply. Thus, there may be a need for additional water to be supplied to the system to more fully utilize the power generation capability of the generators. Ideally, this system should be as efficient as possible in converting motive power into electricity.

Therefore, there is a need for a system for providing water under pressure and in quantities suitable for powering a hydroelectric turbine without requiring the construction of a large dam. Further, there is also a need for efficient methods and systems to elevate water so that it may be delivered across a distance. Moreover, such a system should be operable in situations where water is a scarce commodity by being capable of implementation as a closed system.

BRIEF SUMMARY

The invention, generally referred to as a hydraulic power apparatus, meets these and other needs. Embodiments of the invention relate to hydroelectric generators, and have special applications to generators that are activated by a fluid flowing through a conduit. By establishing a weightless condition of a large wheel equipped with internal independent chambers submerged within a reservoir of water, a pressurized stream of fluid may be provided to a hydro-turbine and generator in an ecologically sound way. The hydraulic power apparatus is designed to provide a sufficient flow of fluid to perform work by controlling the exposure of its internal chambers to the surrounding environment, or atmosphere, through a series of valves, conduits and piping as the position of the chambers is changed by rotating the apparatus.

In its closed system form, an embodiment of the invention uses a large wheel of a predetermined diameter that is submerged in water and rotated in such a way as to supply a flow of fluid under pressure to a mechanical device, such as a rotary engine, which converts the flow of fluid into mechanical energy suitable to perform work, such as by providing motive force to a generator.

In an exemplary embodiment of the invention, which is not intended to limit the scope of the invention, the fluid providing energy to the mechanical device is water, and the mechanical device for converting the flow of water to work is an internally or externally mounted conventional hydro-turbine. In this exemplary embodiment, the work output of the hydro-turbine may be converted into electrical energy by means of a conventional generator coupled to the hydro-turbine.

To this end, a large wheel, submerged in water and made weightless (i.e., neutrally buoyant) in the water by the presence of sufficient ballast, is rotated on a shaft so that a first chamber within the wheel is positioned at an uppermost position of the wheel. A flow of water from the first chamber is then directed through a conduit to a hydro-turbine, which drives an electrical generator. The discharge from the turbine is directed to a reservoir that drains into a second chamber within the wheel which is radially opposed to the first chamber so that the second chamber is in a lowermost position when the first chamber is in the uppermost position. The rate of flow into the bottom chamber is maintained so that it is equal to the rate of flow out of the upper chamber gallon for gallon, thereby maintaining the weight of the apparatus at a constant value during the exchange of water. Advantageously, the hydraulic power apparatus may be constructed using conventional conduits, valves, chambers, hydraulic turbines and piping.

BRIEF DESCRIPTION OF THE SEVERAL VIEWS OF THE DRAWINGS

The accompanying drawings, which are incorporated in and constitute a part of this specification, illustrate various embodiments of the invention and, together with the general description of the invention given above and the detailed description of the embodiments given below, serve to explain the embodiments of the invention.

DETAILED DESCRIPTION

Figure 1:
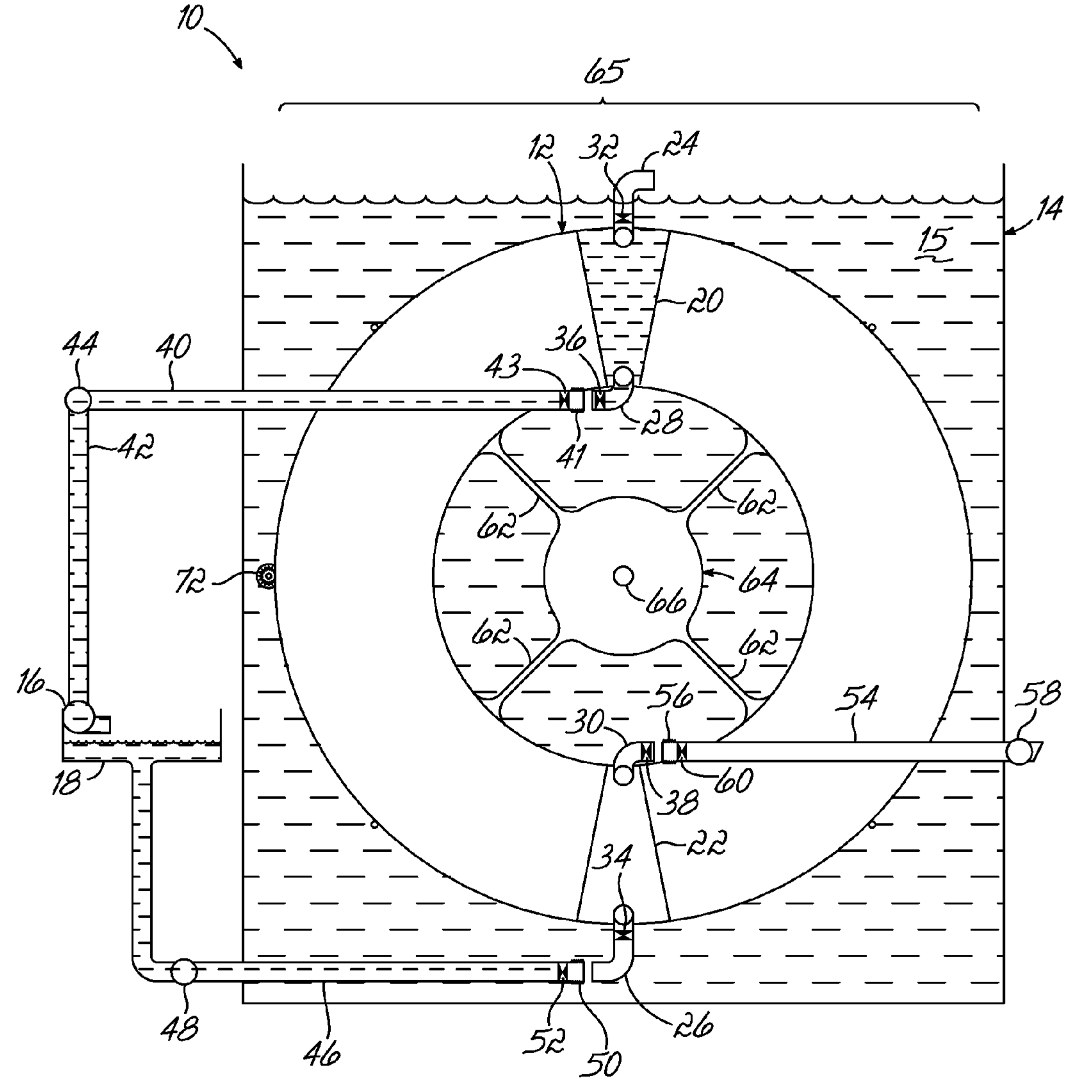
FIG. 1 is a diagrammatic cross-sectional end view of a hydraulic power apparatus showing a first chamber in an uppermost position and filled with liquid, and a second chamber that is empty of liquid and in a lowermost position according to the principles of the present invention.

A hydraulic power apparatus system provides a liquid, such as water, under pressure for generating work and/or ultimately electrical power. The system includes first and second containment chambers which provide buoyancy and between which liquid is exchanged, a separate chamber for containing ballast, and valves, piping and conduits for directing liquid (e.g., water) and other fluids (e.g., air) as required throughout the process. The specific volumes, dimensions and shapes used in the exemplary embodiments contained herein are intended only to provide clarity and for explanatory purposes, and are in no way intended to limit the scope of the invention. In a typical application which is not intended to limit the invention, the flow of liquid produce by the weightless water wheel is converted to work through use of a hydraulic turbine which is attached to an electrical generator. Although the terms "hydraulic turbine" or "hydro-turbine" are used throughout this specification and in the claims, it should be understood that as used herein, the terms "hydraulic turbine" and "hydro-turbine" include any rotary engine or motor that may be used to convert the energy contained in pressurized fluids into mechanical energy.

The subassembly, which includes the containment chambers that provide buoyancy to the weightless water wheel, is referred to herein as a buoyancy wheel. A vessel for containing ballast may be positioned in the center of the buoyancy wheel, and is referred to as a ballast chamber. The ballast chamber may be attached to the buoyancy wheel by fixed supports or spokes. In one particular embodiment, four spokes are used to attach the buoyancy wheel and ballast chamber so that the buoyancy wheel and the ballast chamber rotate as one unit when motivated. The ballast chamber may include a center opening running across the length of the axis of the ballast chamber to accommodate a shaft that locates the apparatus as it is rotated. The apparatus may be supported on the shaft by bearings located at each end of the shaft. The bearings may be secured to assembly shaft bearing support columns, which are stands fixed to an internal base of the main reservoir that are configured to elevate the buoyancy wheel above the floor of the reservoir.

The buoyancy wheel has two separate individual internal chambers positioned 180 degrees apart, which are referred to as containment chambers. Each containment chamber includes two ports, with one port (referred to as a containment chamber outside port) being positioned on the outer diameter of the containment chamber, and the other port (referred to as a containment chamber inside port) being positioned on an inner diameter of the containment chamber. The ports serve as conduits that allow water to enter and exit the containment chambers, as well as for venting atmospheric gasses from the chambers and admitting atmosphere to the containment chambers to serve as displacement for water discharging from the containment chamber as needed. Each port includes a valve used to breach or isolate the ports as required throughout the process. The valves are referred to respectively as outside port isolation valves and inside port isolation valves. In operation, the entire apparatus is submerged in water contained within the main reservoir, which may be filled to a specific level. The ballast chamber provides a mechanism which allows the system operator to add or remove ballast so that the weight of the rotating portion of the apparatus is generally equal to the displaced water when the apparatus is submerged in the main reservoir. The resulting weightless, or neutrally buoyant, state of the entire rotating portion of the apparatus may reduce the forces necessary to reposition the wheel on its axis. The amount of ballast used is such that the wheel is neutrally buoyant when one of the containment chambers is filled to capacity and the other containment chamber is empty of water, or when the aforementioned volume of containment chamber water is distributed equally between the containment chambers. To provide a means to rotate the buoyancy wheel and thereby position the containment chambers, a rotary drive unit may be mounted in a manner so that an output pinion or gear meshes to gear teeth fixed around the outside circumference of the buoyancy wheel. In this way, the apparatus may be rotated as desired throughout the cycle process.

Referring now to FIGS. 1-4, in which like reference numerals refer to like features and in accordance with an embodiment of the invention, a weightless water wheel 10 includes a buoyancy wheel 12 suspended in a main reservoir 14 filled with a liquid 15 (e.g., water), a hydro-turbine generator 16, and turbine discharge reservoir 18. The buoyancy wheel 12 includes a first containment chamber 20 radially opposed to a second containment chamber 22. The first and second containment chambers include outside ports 24, 26 and inside ports 28, 30, respectively. The ports include isolation valves 32, 34, 36, 38 that may be selectively opened and closed so as to allow fluids (such as water and air) to enter and exit the containment chambers 20, 22.

Figure 2:
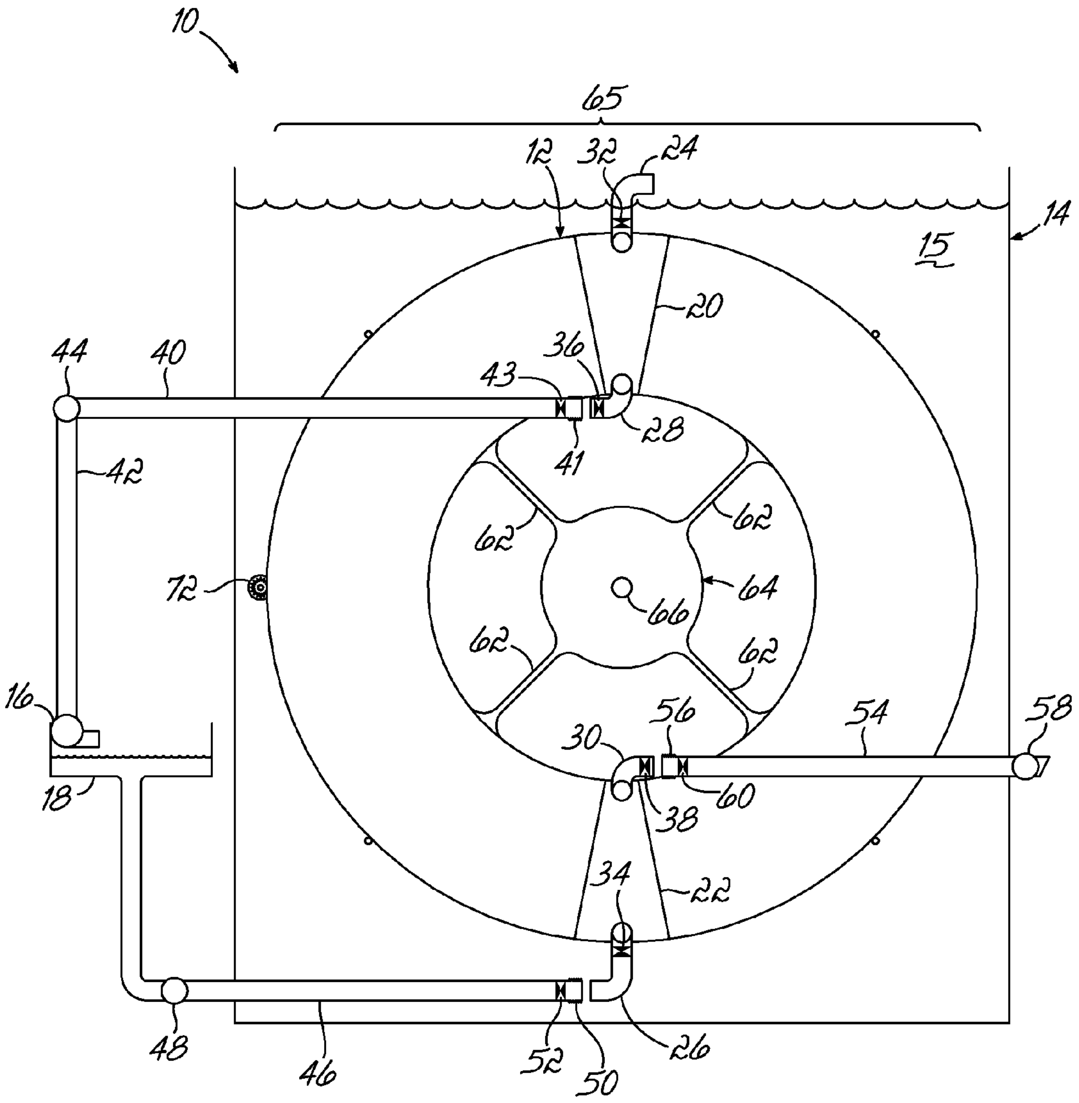
FIG. 2 is a diagrammatic cross-section end view of the hydraulic power apparatus in FIG. 1 illustrating an embodiment according to the principles of the present invention with the liquid removed so that each component may be clearly seen.
Figure 3:
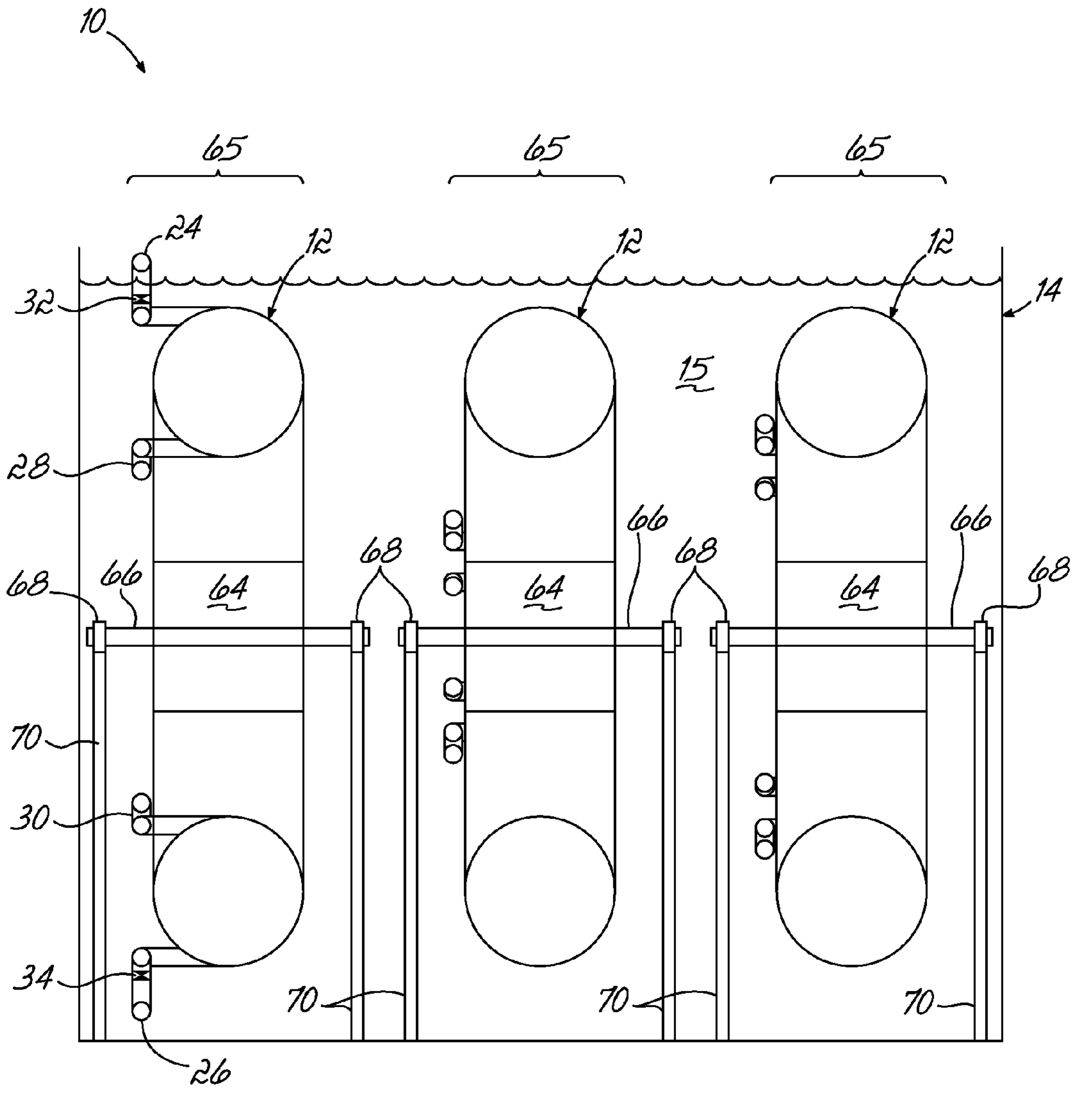
FIG. 3 is a diagrammatic cross-sectional front view of a plurality of hydraulic power apparatuses in FIG. 2 according to the principles of the present invention.
Figure 4:
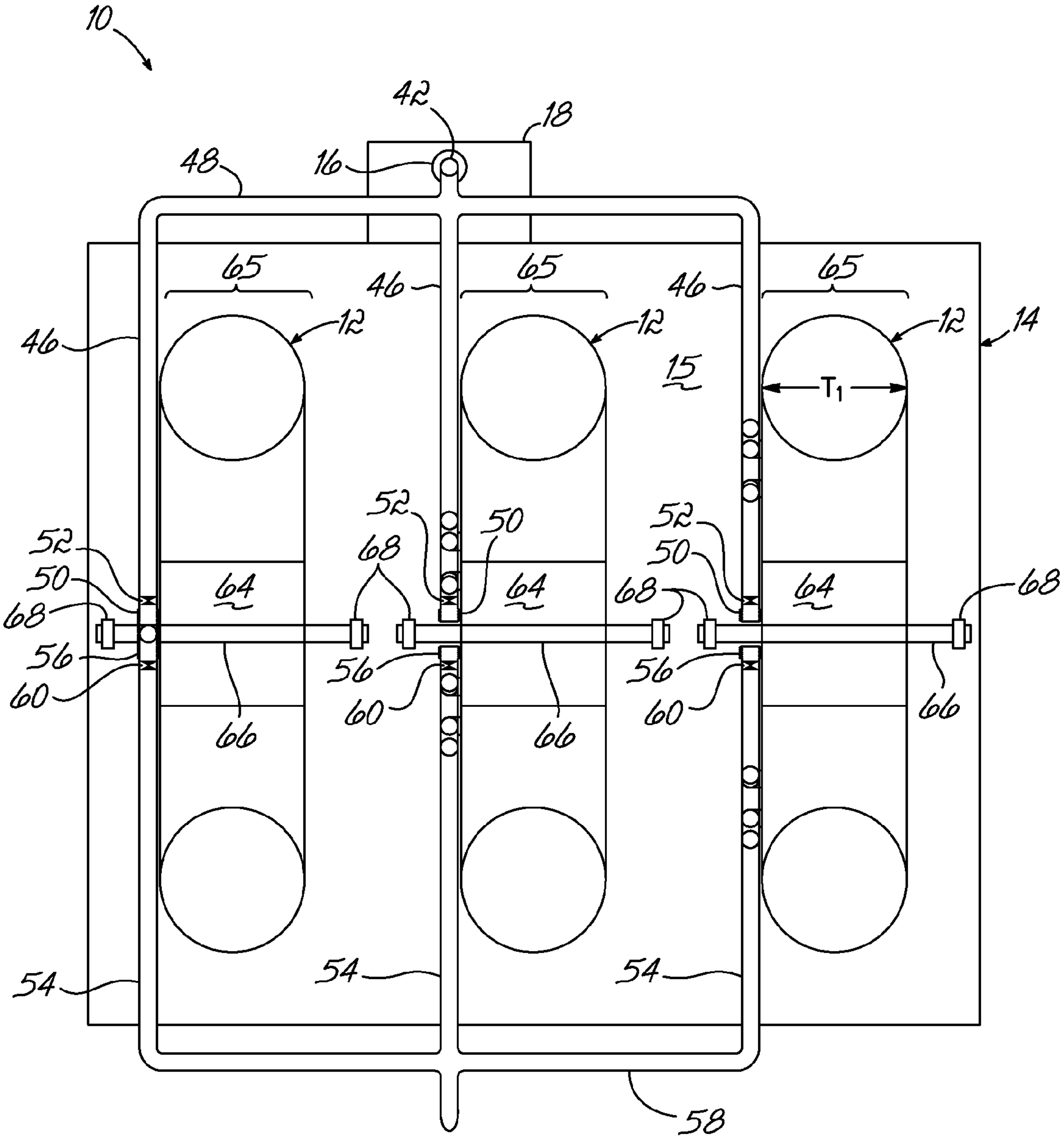
FIG. 4 is a diagrammatic cross-sectional top view of the hydraulic power apparatuses in FIG. 3 according to the principles of the present invention.

A containment chamber discharge duct 40 includes a first end that is selectively fluidically coupleable to the inside ports 28, 30 of the containment chambers 20, 22 when the containment chambers are in an uppermost position (as illustrated by the position of first containment chamber 20 in FIGS. 1 and 2). This selective coupling may be provided by a containment chamber discharge extractable/retractable piping 41, which may be extended or retraced as desired. The containment chamber discharge duct 40 further includes a second end fluidically coupled to a top end of penstock 42 by a containment chamber discharge header 44. A bottom end of penstock 42 in turn may be coupled to an input of the hydro-turbine 16. The hydro-turbine 16 may thereby be fluidically coupled to a containment chamber in the uppermost position by extending the containment chamber discharge extractable/retractable piping 41 so that the inside port 28, 30 of the respective containment chamber 20, 22 (shown as the first containment chamber 20 in FIG. 1) is fluidically coupled to the input port of the hydro-turbine 16. To prevent liquid 15 from entering the first end of the discharge duct 40 when the discharge duct 40 is not coupled to one of the inside ports 28, 30, a containment chamber discharge duct isolation valve 43 may be located near the first end of the discharge duct 40.

To provide a return path for the liquid 15 between the hydro-turbine 16 and the containment chamber in the lowermost position (e.g., the second containment chamber 22), the turbine discharge reservoir 18 may be fluidically coupled to a first end of a hydraulic turbine discharge reservoir return duct 46 by a hydraulic turbine discharge reservoir return header 48. The return duct 46, in turn, may have a second end that is selectively fluidically coupleable to the outside ports 24, 26 of the containment chambers 20, 22 when the containment chambers are in the lowermost position (as illustrated by the position of the second containment chamber 22 in FIGS. 1 and 2). This selective coupling may be provided by a hydraulic turbine discharge reservoir return duct extractable/retractable piping 50, which may be extended or retracted as desired. To prevent liquid 15 from entering the second end of the return duct 46 when the return duct 46 is not coupled to one of the outside ports 24, 26, a hydraulic turbine discharge reservoir return duct isolation valve 52 may be located near the second end of the return duct 46.

A containment chamber atmospheric vent duct 54 provides a path for fluids (e.g., air) to be vented from containment chambers 20, 22 while in the lowermost position. To this end, the vent duct 54 includes a first end that is selectively fluidically coupleable to the inside ports 28, 30 of the containment chambers 20, 22 when the respective containment chamber is in the lowermost position (as illustrated by the position of the second containment chamber 22 in FIGS. 1 and 2). This selective coupling may be provided by an atmospheric vent extractable/retractable piping 56, which may be extended or retracted as desired. A second end of vent duct 54 may be fluidically coupled to a containment chamber atmospheric vent duct header 58, which is vented to the atmosphere. To prevent the liquid 15 from entering the vent duct 54 and being discharged through the vent duct header 58 when the first end of the vent duct 54 is not coupled to an inside port 28, 30, a containment chamber atmospheric vent duct isolation valve may be located near the first end of vent duct 54.

In the exemplary embodiment shown in FIGS. 1-4, the buoyancy wheel 12 is supported by a plurality of spokes 62 that couple the buoyancy wheel 12 to a ballast chamber 64. The ballast chamber 64 may be located near the center of the buoyancy wheel 12 and provides a chamber having a sufficient displacement so that the ballast chamber 64 may be used to equalize the weight of the rotating components of the weightless water wheel (collectively referred to as a rotating assembly 65) with the water displaced by the rotating assembly. To this end, the ballast chamber 64 may displace an amount of water sufficient to allow the rotating assembly 65 to float in the liquid 15 when the ballast chamber 64 is empty so that the buoyancy of the rotating assembly 65 may be adjusted by adding ballast to the ballast chamber 64. The weight of the rotating assembly 65 may thereby be made equal to the liquid 15 displaced by the rotating assembly 65 when the rotating assembly 65 is submerged in the liquid 15 by adding an appropriate amount of ballast to the ballast chamber 64. The ballast may be any suitable material (e.g., water) having sufficient mass to equalize the buoyancy as heretofore described. An assembly rotation shaft 66 passes through the ballast chamber 64 and is supported on each end by an assembly shaft bearing 68, with each bearing 68 elevated by an assembly shaft bearing support column 70 so that the rotating assembly 65 is rotatably suspended in the reservoir 14. A rotary drive unit 72 mechanically coupled to the rotating assembly 65 is configured to selectively rotate the rotatable assembly 65 to position the containment chambers 20, 22 as required to operate the weightless water wheel 10.

Figure 5:
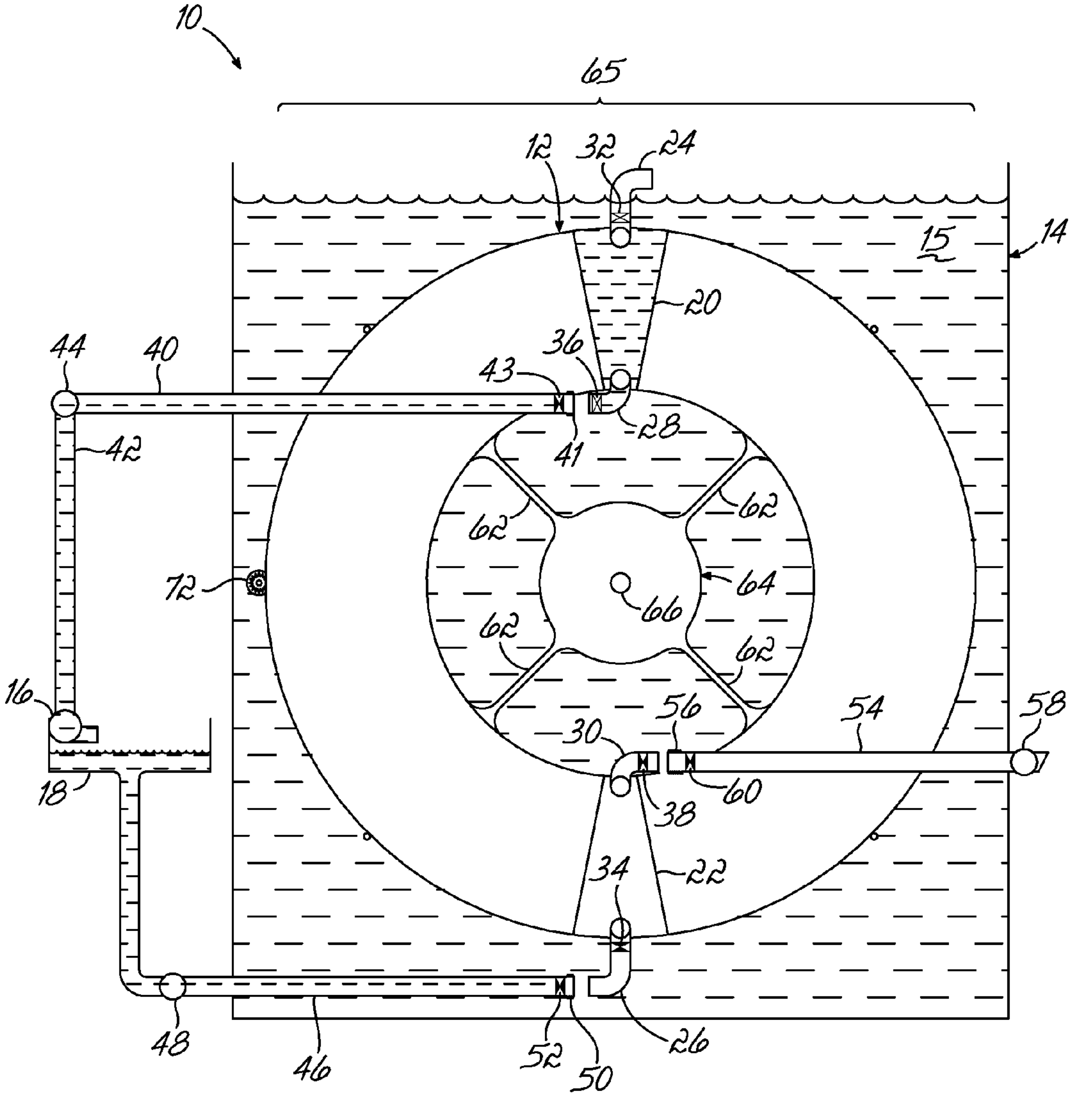
FIG. 5 is a diagrammatic cross-sectional end view of the hydraulic power apparatus in FIG. 1 that has been rotated and rested so a full containment chamber is in the uppermost position and an empty containment chamber is at rest at the lowermost position.

Referring now to FIG. 5, the weightless water wheel 10 is shown at the end of one cycle and in position to begin another. As shown, the first containment chamber 20 is filled to capacity and has been rotated to the uppermost position of the buoyancy wheel 12. Due to how the containment chambers are positioned within the buoyancy wheel 12, rotating the first containment chamber 20 to the uppermost position results in the empty second containment chamber 22 being in the lowermost position. The buoyancy wheel 12 is brought to a controlled stop in the position shown in FIG. 5. The outside and inside port isolation valves 32, 36 of first containment chamber 20 remain open and outside and inside port isolation valves 34, 38 of the second containment chamber 22 remain closed from the previous cycle. The discharge duct expandable/retractable piping 41, the return duct extractable/retractable piping 50, and the atmospheric vent extractable/retractable piping 56 are initially in the retracted position so that the rotating assembly 65 may be moved freely into position. The containment chamber discharge duct isolation valve 43, the turbine discharge reservoir return duct isolation valve 52, and the containment chamber atmospheric vent duct isolation valve 60 are all shown as closed from the previous cycle.

Figure 6:
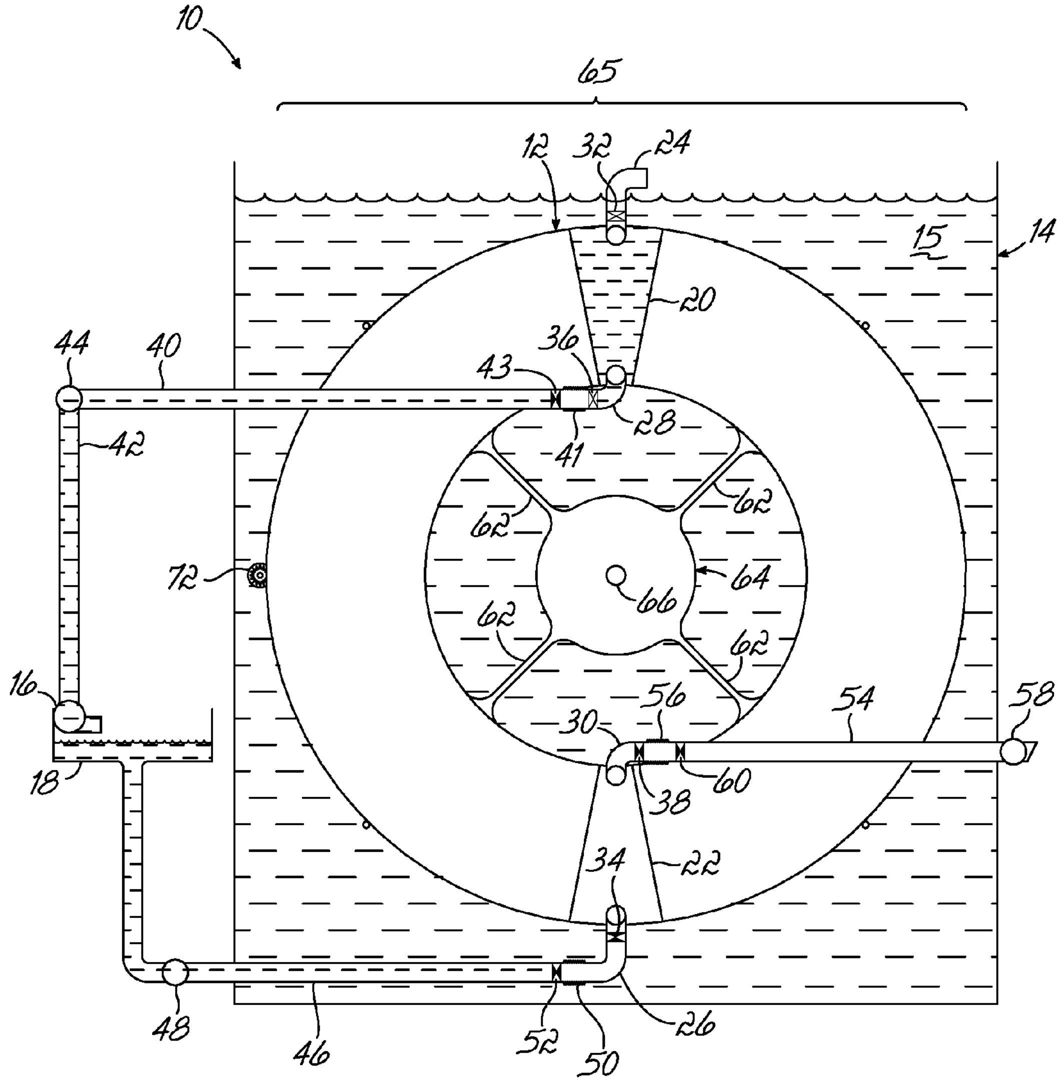
FIG. 6 is a diagrammatic cross-sectional end view of the hydraulic power apparatus in FIG. 5 with expandable piping expanded and coupled to respective ports of the containment chambers.
Figure 15:
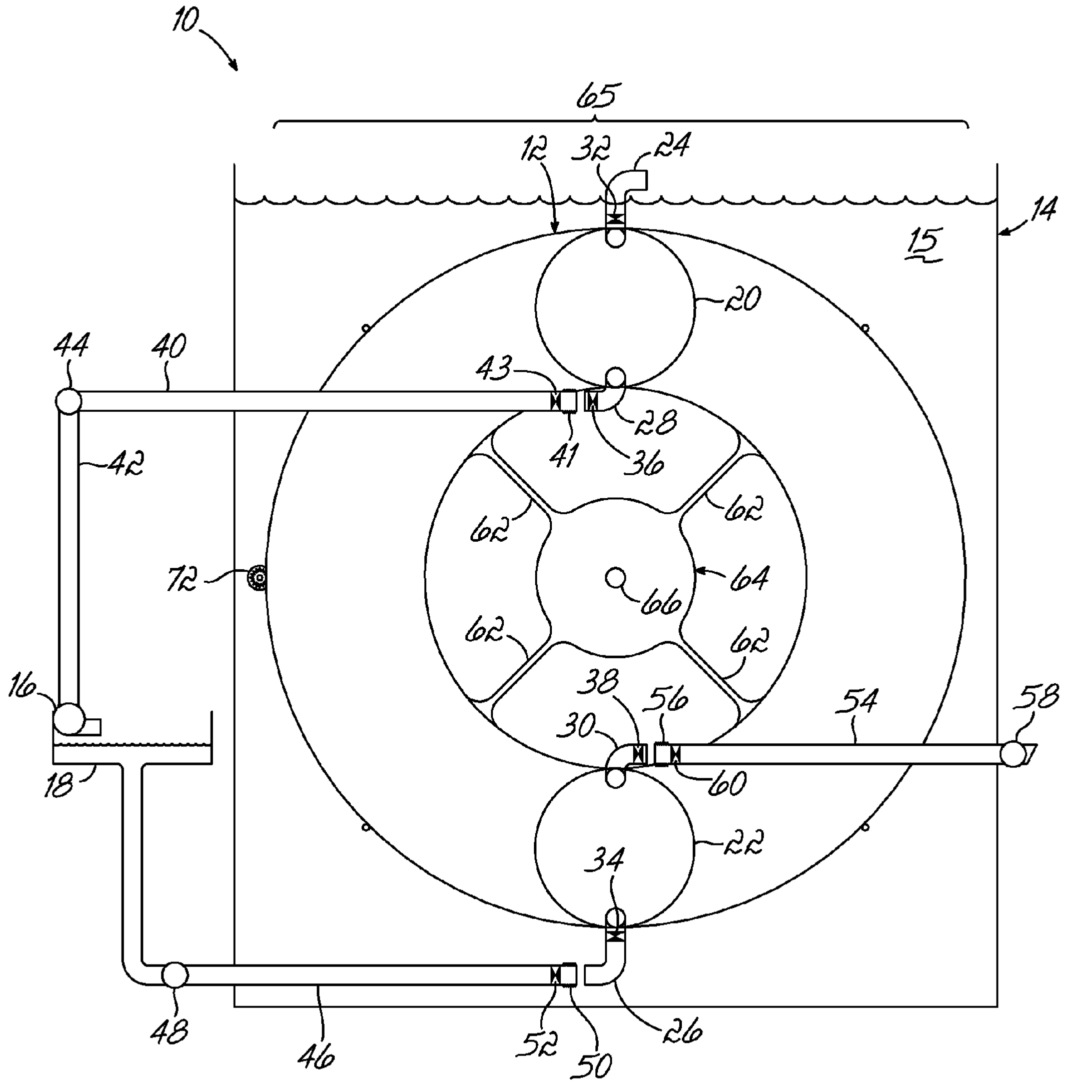
FIG. 15 is a diagrammatic cross-sectional end view of an alternative embodiment of the hydraulic power apparatus including first and second containment chambers having a cylindrical shape.
Figure 16:
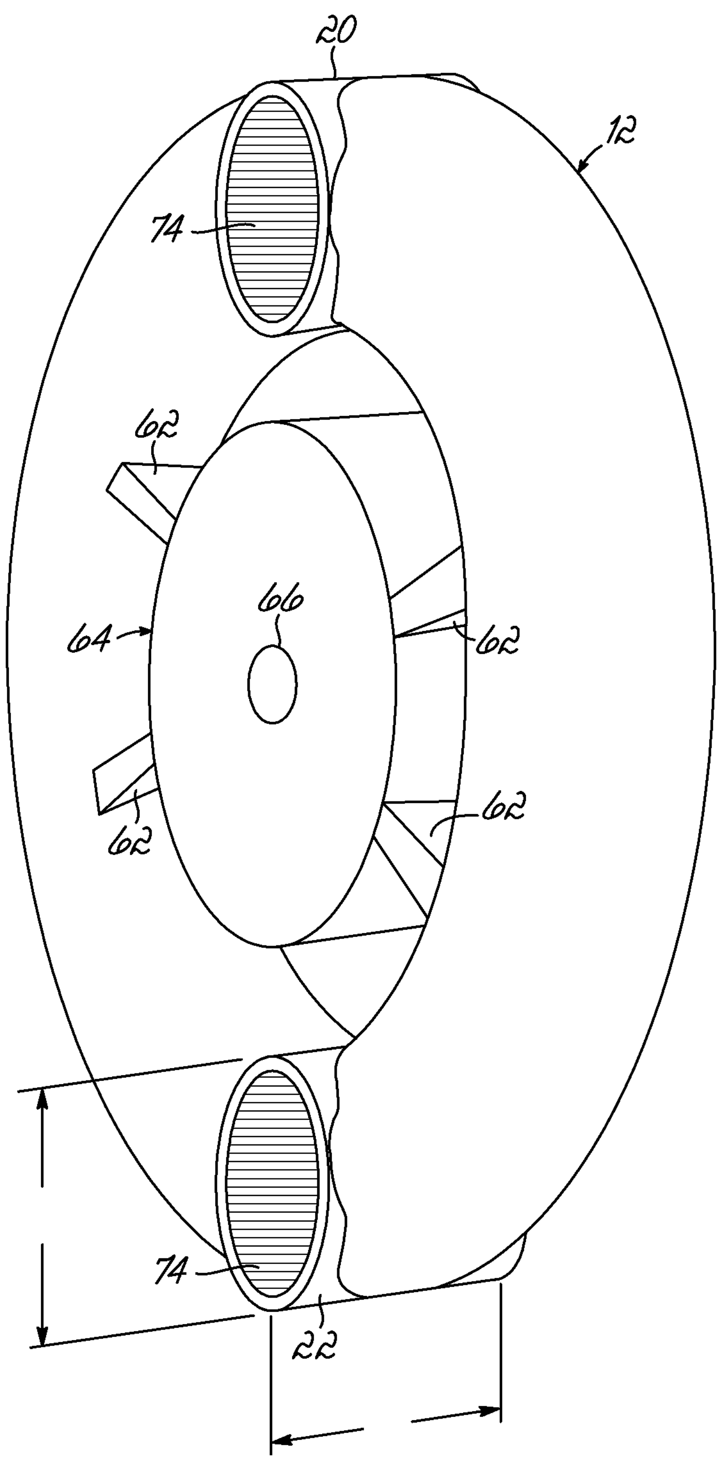
FIG. 16 is a perspective view of the hydraulic power apparatus in FIG. 15 showing containment chamber louvered end caps.
Figure 17:
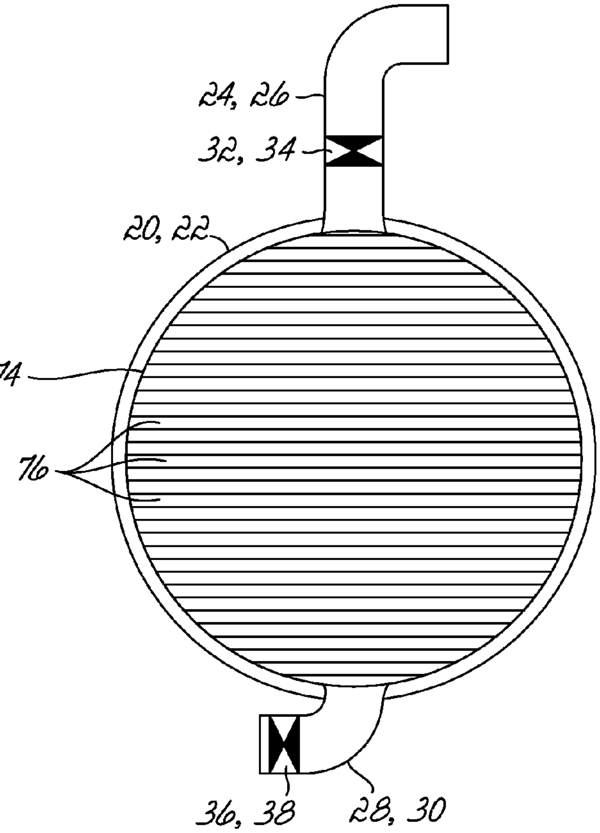
FIG. 17 is a diagrammatic front view of the louvered end caps shown in FIG. 16 showing additional details of the louvers.

Referring now to FIG. 6, the discharge duct expandable/retractable piping 41, the return duct extractable/retractable piping 50, and the atmospheric vent extractable/retractable piping 56 are all expanded and sealed to respective containment chamber ports 28, 26, 30, thereby coupling the ports to the discharge duct 40, the reservoir return duct 46, and atmospheric vent duct 54, respectively. In an alternative embodiment, the containment chambers 20, 22 may be cylindrically shaped and perpendicular within the buoyancy wheel. The containment chambers 20, 22 may also include louvered end caps 74 (FIGS. 15-17). In this alternative embodiment, the louvered caps 74 in the first containment chamber 20 may initially be open from the previous cycle, and will thus need to be closed to seal the internal area of the first containment chamber from atmospheric conditions once the respective ducts have been secured and before the isolation valves are opened.

Figure 7:
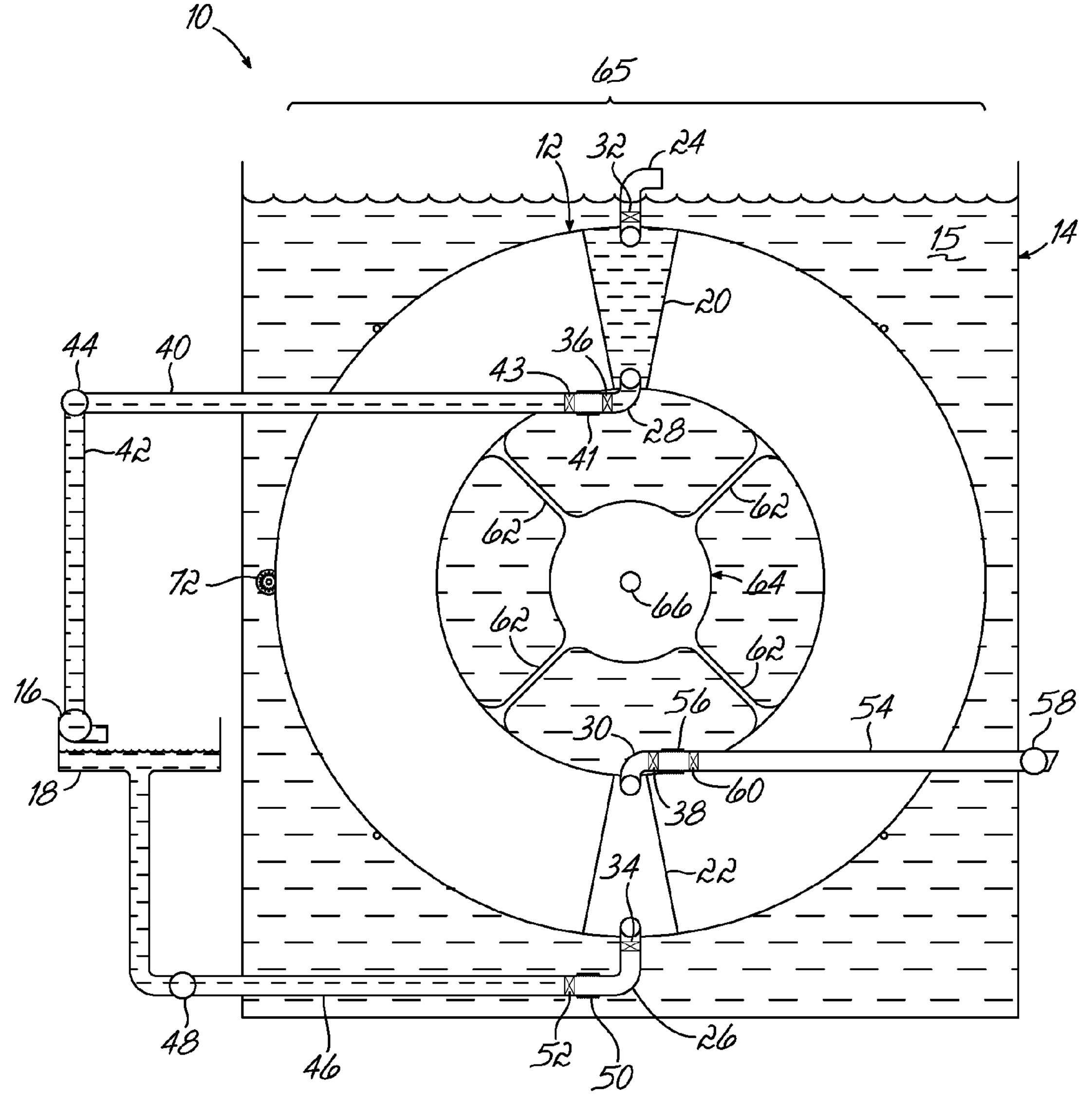
FIG. 7 is a diagrammatic cross-sectional end view of the hydraulic power apparatus in FIG. 6 with the containment chamber port valves and associated conduit isolation valves opened.

Referring now to FIG. 7, once the expandable/retractable pipings 41, 50, 56 are expanded and sealed, the outside port isolation valve 34, inside port isolation valve 38, discharge duct isolation valve 43, return duct isolation valve 52, and the atmospheric vent duct isolation valve 60 are opened.

Figure 8:
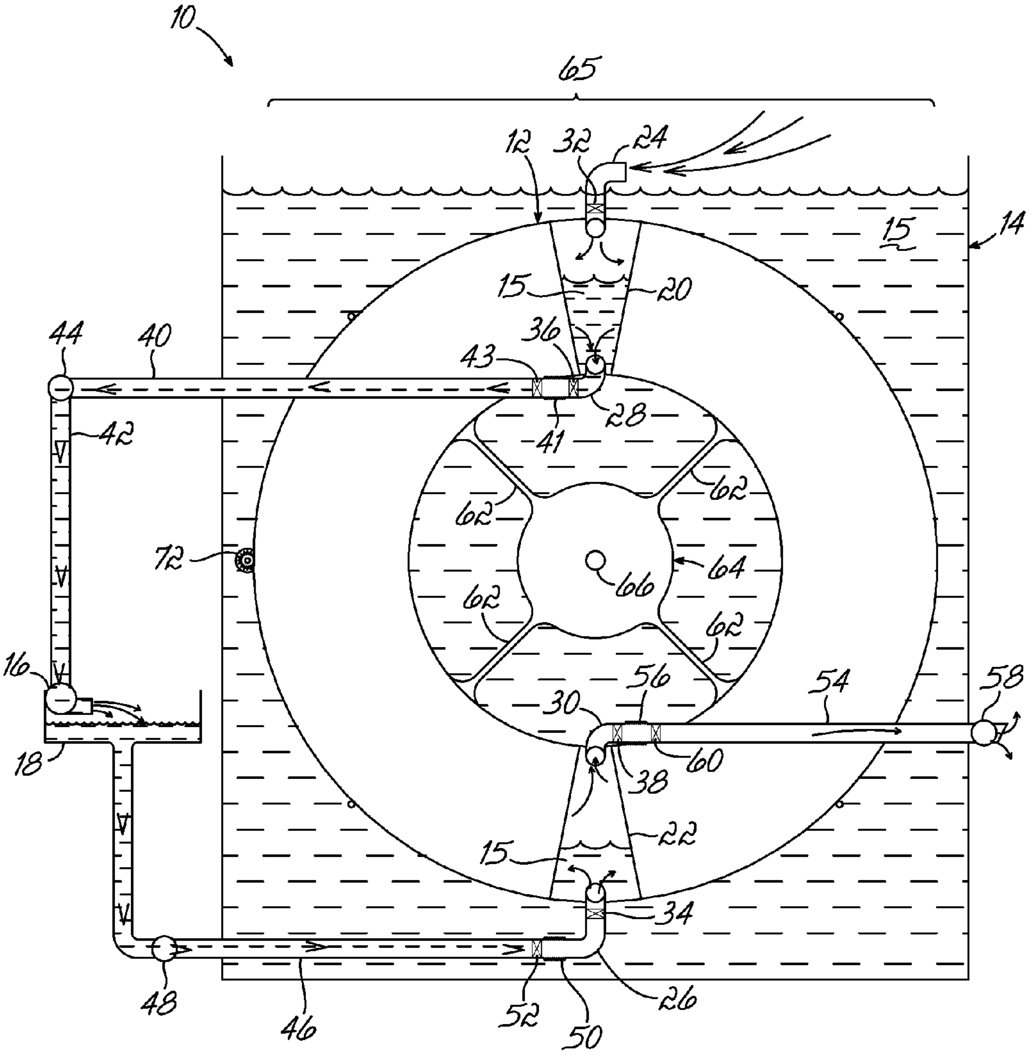
FIG. 8 is a diagrammatic cross-sectional end view of the hydraulic power apparatus in FIG. 7 showing the water draining from the containment chamber in the uppermost position through an inside port into a respective discharge duct while atmosphere is admitted through the outside port, thereby replacing the water leaving the chamber. The discharge into the duct is directed to the discharge duct header, which supplies a hydro-turbine penstock with the water. The penstock passes the water through the hydro-turbine, which discharges the water into the hydro-turbine discharge reservoir. The returning water is directed to the lower containment chamber via associated ducts. As water enters the containment chamber in the lowermost position, displaced air within the chamber is shown being vented through the respective inside port and out an atmospheric vent duct to the atmosphere. The volume of water discharging from the containment chamber in the uppermost position thus equals the volume of water flowing into the containment chamber in the lowermost position, thereby maintaining the weight of the apparatus generally constant throughout the water exchange process.

Referring now to FIG. 8, in response to opening the isolation valves 34, 38, 43, 52, and 60, the liquid 15 from the first containment chamber 20 begins discharging through respective inside port duct 28 through the discharge duct 40 and discharge header 44 to the penstock 42. Ambient atmosphere (e.g., air) is admitted through the outside port 24 of first containment chamber 20 to replace the liquid 15 being discharged to into the discharge duct 40. The liquid 15 fed to the discharge header 44 drops the length of the penstock 42, thereby supplying the hydraulic turbine 16 with pressurized liquid 15. Water is discharged from the hydraulic turbine 16 into the turbine discharge reservoir 18, where it is routed to the lower containment chamber via the return duct 46, expandable piping 50, and outside port 26. Due to the closed nature of the hydraulic system, the containment chamber in the lowermost position (as shown here, the second containment chamber 22) is filled at generally the same rate as water is being discharged from the containment chamber in the uppermost position. Air from within the second containment chamber 22 is displaced by the inflowing liquid 15 and escapes through the respective inside port 30. The air is then discharged to atmosphere via the atmosphere vent duct 54 and vent duct header 58. The rate of flow from the first containment chamber 20 is controlled at a rate that is generally equal to that returning to the second containment chamber 22, thereby maintaining the rotating assembly 65 at a constant weight and buoyant state while submerged within the main reservoir 14.

Figure 9:
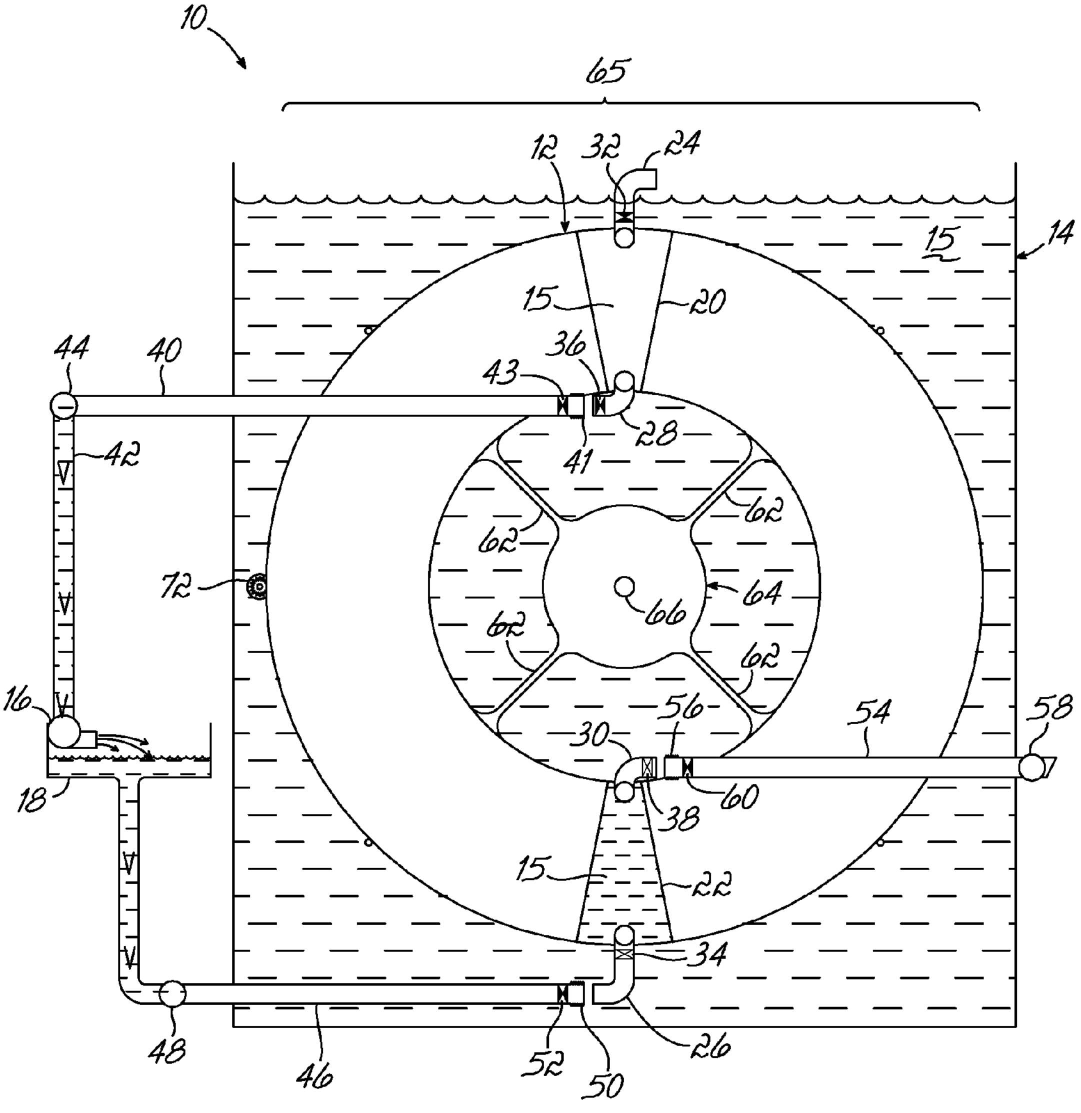
FIG. 9 is a diagrammatic cross-sectional end view of the hydraulic power apparatus in FIG. 8 showing the containment chamber in the uppermost position completely drained, and the containment chamber in the lowermost position filled to capacity. In addition, the appropriate valves are shown as closed and the respective expandable/retractable pipe sections are shown retracted. The lower containment chamber inside/outside port valves are shown as remaining open, thus equalizing the pressure on the containment chamber inside surfaces with that of the main reservoir.

Referring now to FIG. 9, once the liquid 15 is fully discharged from the first containment chamber 20 and the second containment chamber 22 is filled to capacity, the containment chambers 20, 22 are decoupled from the hydraulic turbine 16. To this end, the isolation valves 32, 36, 43, 52, 60 associated with first containment chamber 20, discharge duct 40, return duct 46, and atmospheric vent duct 54 are shut. Because the second containment chamber 22 is now full to capacity with liquid 15, the isolation valves 34, 38 associated with the second containment chamber 22 may be left open to expose the inside area of the lowermost containment chamber to the atmosphere of the reservoir 14. With the isolation valves closed, the extractable/retractable piping sections 41, 50, and 56 are retracted from their respective ports 28, 26, 30, thereby freeing the rotating assembly 65 to be rotated to a new position. In an alternative embodiment, the containment tanks 20, 22 may be cylindrical in shape and include louvered end caps 74 (FIGS. 15-17). In this alternative embodiment, the louvered end caps 74 of the second containment chamber 22 may be opened to further expose the entire inside area of the lowermost containment chamber to the atmosphere of the reservoir 14.

Figure 10:
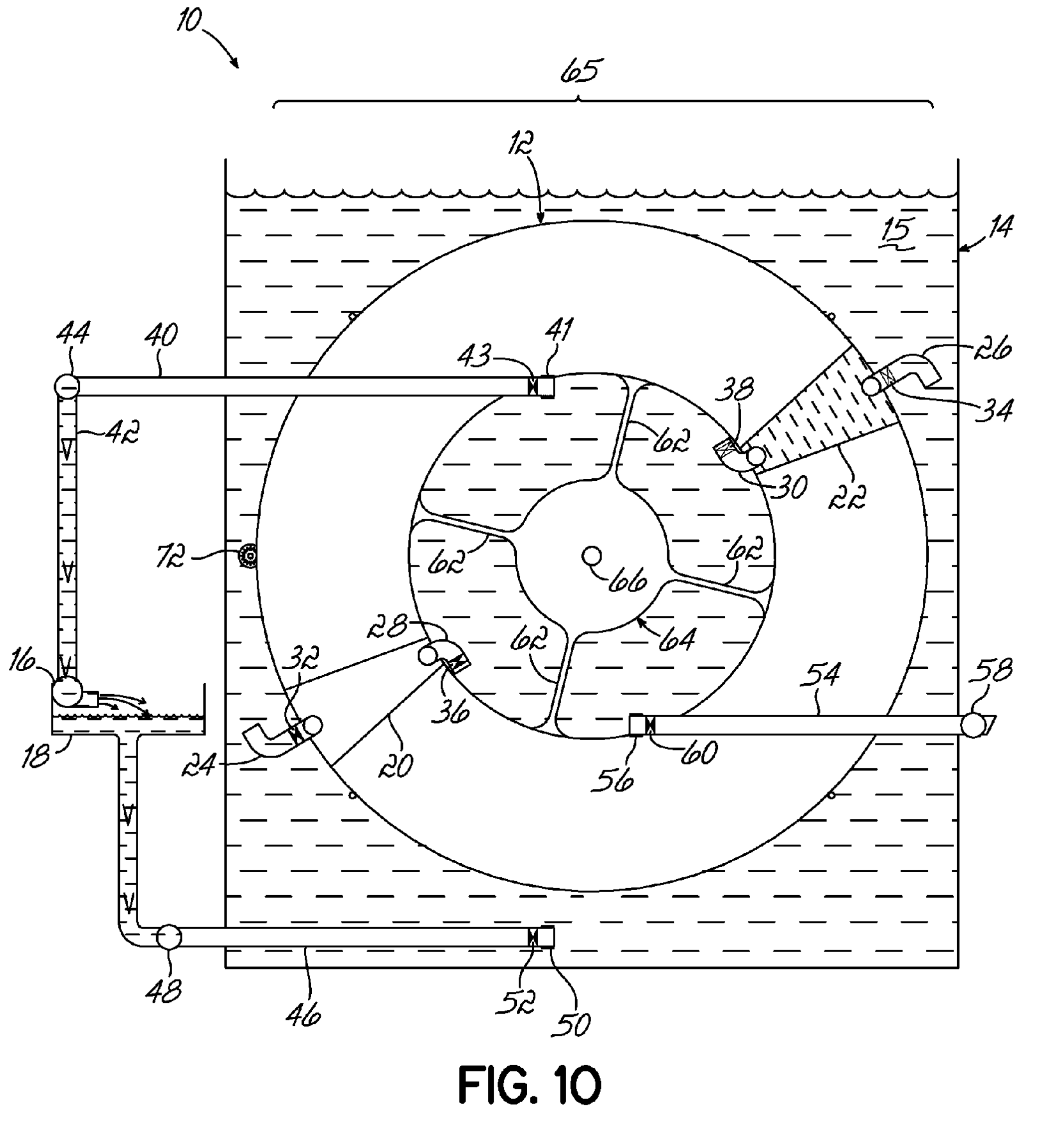
FIG. 10 is a diagrammatic cross-sectional end view of the hydraulic power apparatus in FIG. 9 with the apparatus shown in mid-rotation with the now full containment chamber being repositioned to the uppermost position and the now empty containment chamber being repositioned to the lowermost position.
Figure 11:
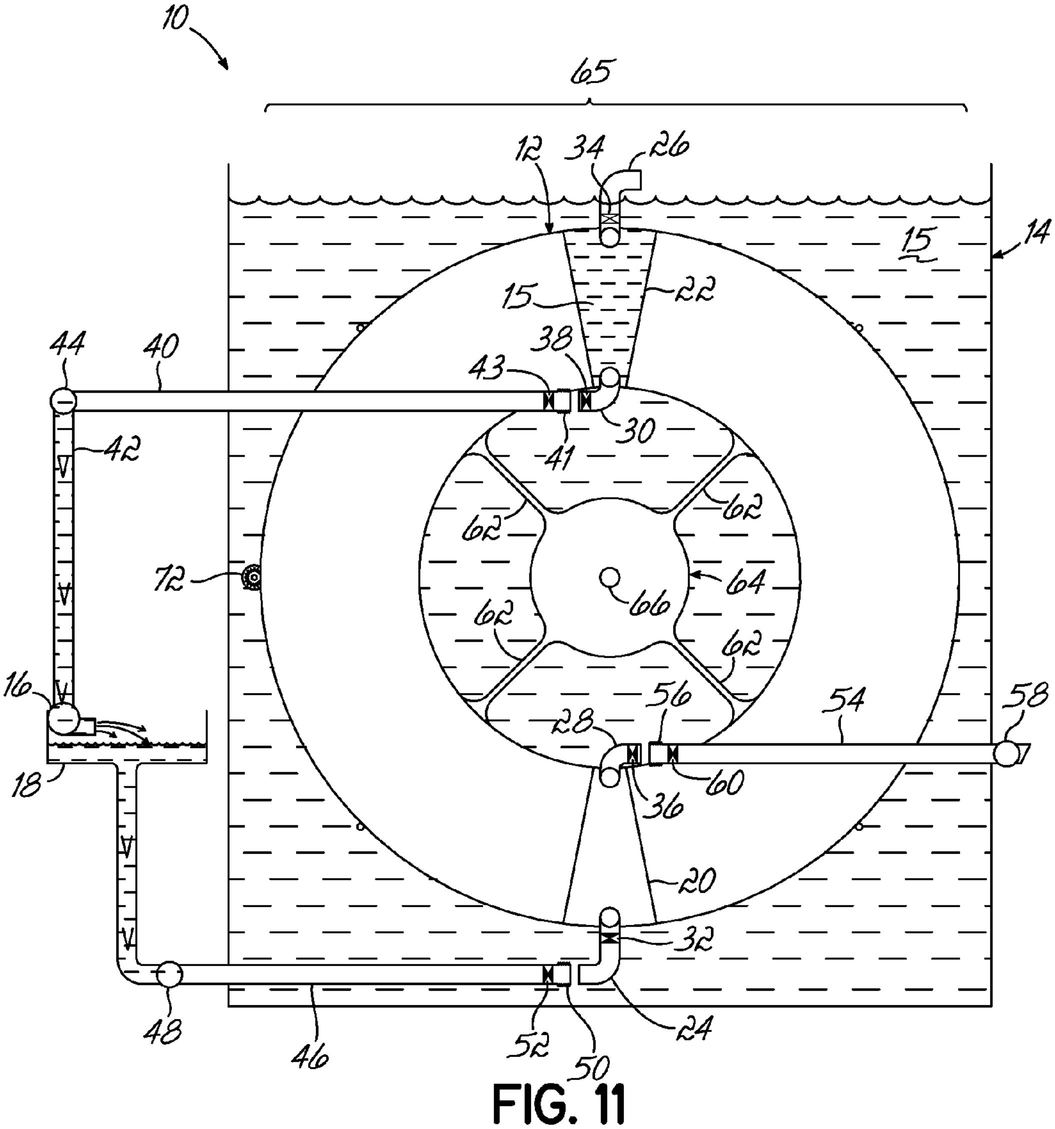
FIG. 11 is a diagrammatic cross-sectional end view of the hydraulic power apparatus in FIG. 10 showing the apparatus having been rotated 180 degrees from its initial position in FIGS. 5-8 and in a position to repeat the process of exchanging water from the containment chamber in the uppermost position to the containment chamber in the lowermost position.

Referring now to FIGS. 10 and 11, once the rotating assembly 65 is decoupled from the discharge duct 40, return duct 46, and vent duct 54, the rotary drive unit 72 may be activated. In response to the rotary drive unit 72 being activated, the rotating assembly 65 may begin to rotate (counterclockwise as illustrated in FIG. 10, although the rotating assembly could also be rotated clockwise). The rotating assembly is thereby rotated until the filled second containment chamber 22 is brought into the uppermost position, and the empty first containment chamber 20 is brought into the lowermost position (FIG. 11). The open port isolation valves 34, 38 of the second containment chamber 22 allow the internal walls of second containment chamber 22 to be exposed to the pressure of the liquid 15 in the main reservoir 14 throughout the rotation process. The second containment chamber interior provides equal surface area on the opposing walls, resulting in equalized forces against buoyancy wheel 12 as is it being rotated. The amount of water displacement created by the buoyancy wheel 12 within the main reservoir 14 is countered by the amount of specific weight within the ballast chamber 64, thus resulting in a manageable amount of energy being required to rotate the entire apparatus.

When the rotating assembly 65 has been rotated so that the now filled to capacity second containment chamber is in the uppermost position, and the now empty first containment chamber is in the lowermost position, the rotary drive unit 72 may be deactivated to so that the rotation stops. At this point the apparatus has completed a full cycle and is in position to start another cycle as shown in FIG. 8. A consistent flow of liquid 15 may be provided by ganging a tandem of weightless water wheels so while one wheel is being rotated, liquid 15 is provided to the hydraulic turbine 16 from another of the wheels.

Figure 12:
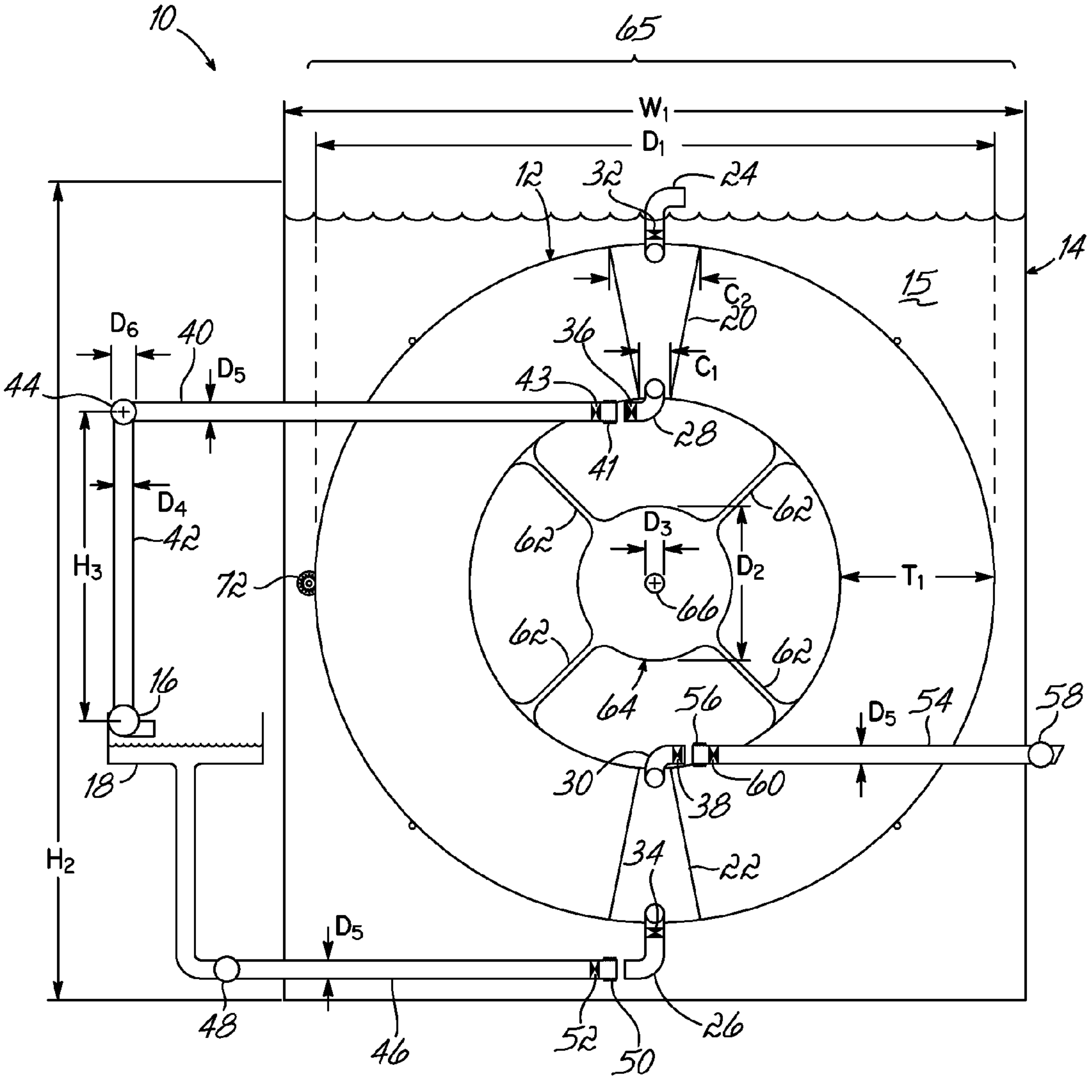
FIG. 12 is a diagrammatic cross-sectional end view of the hydraulic power apparatus in FIGS. 1-11 illustrating exemplary dimensions of one potential embodiment of the invention.
Figure 13:
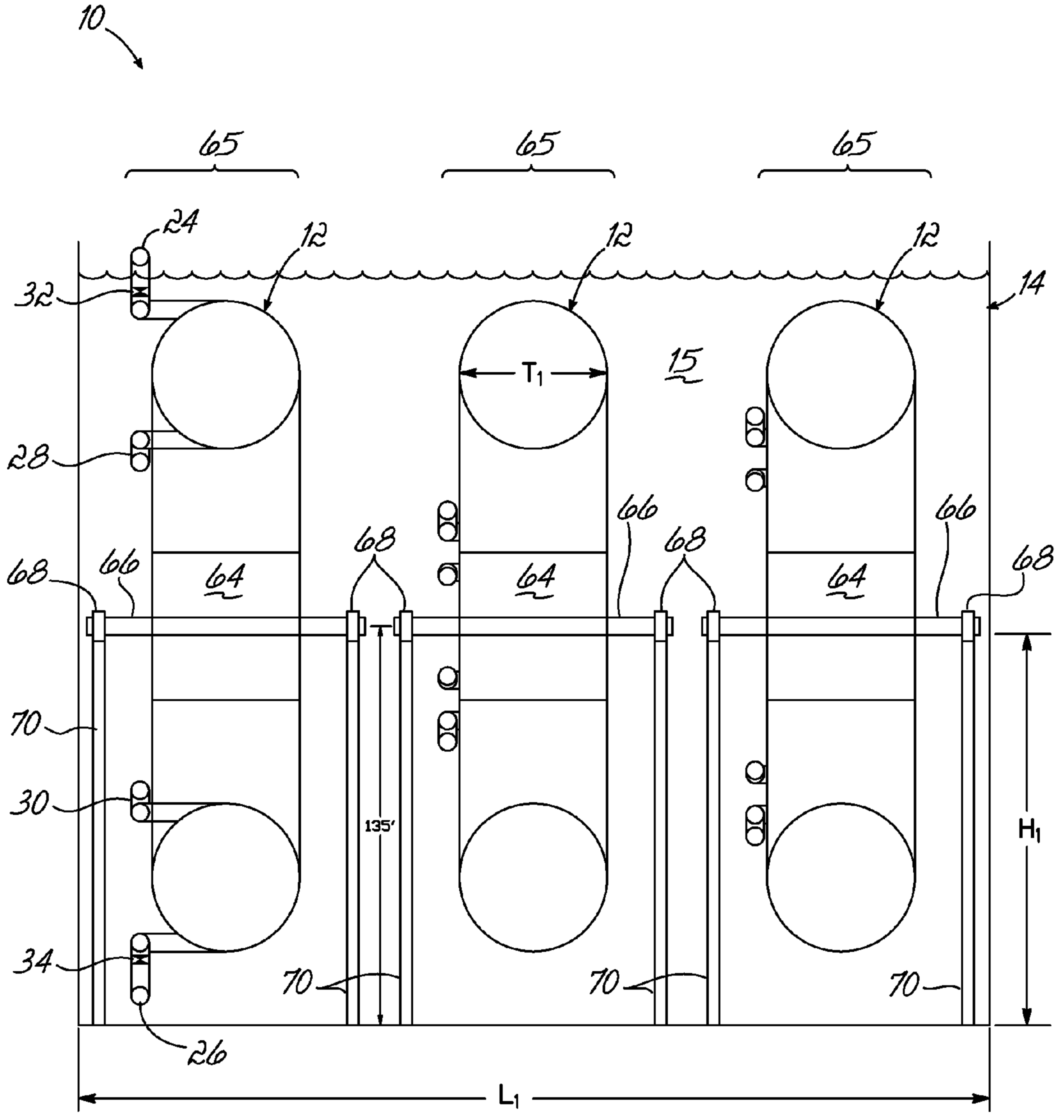
FIG. 13 is a diagrammatic cross-sectional front view of the hydraulic power apparatuses in FIG. 3 illustrating exemplary dimensions of one potential embodiment of the invention.
Figure 14:
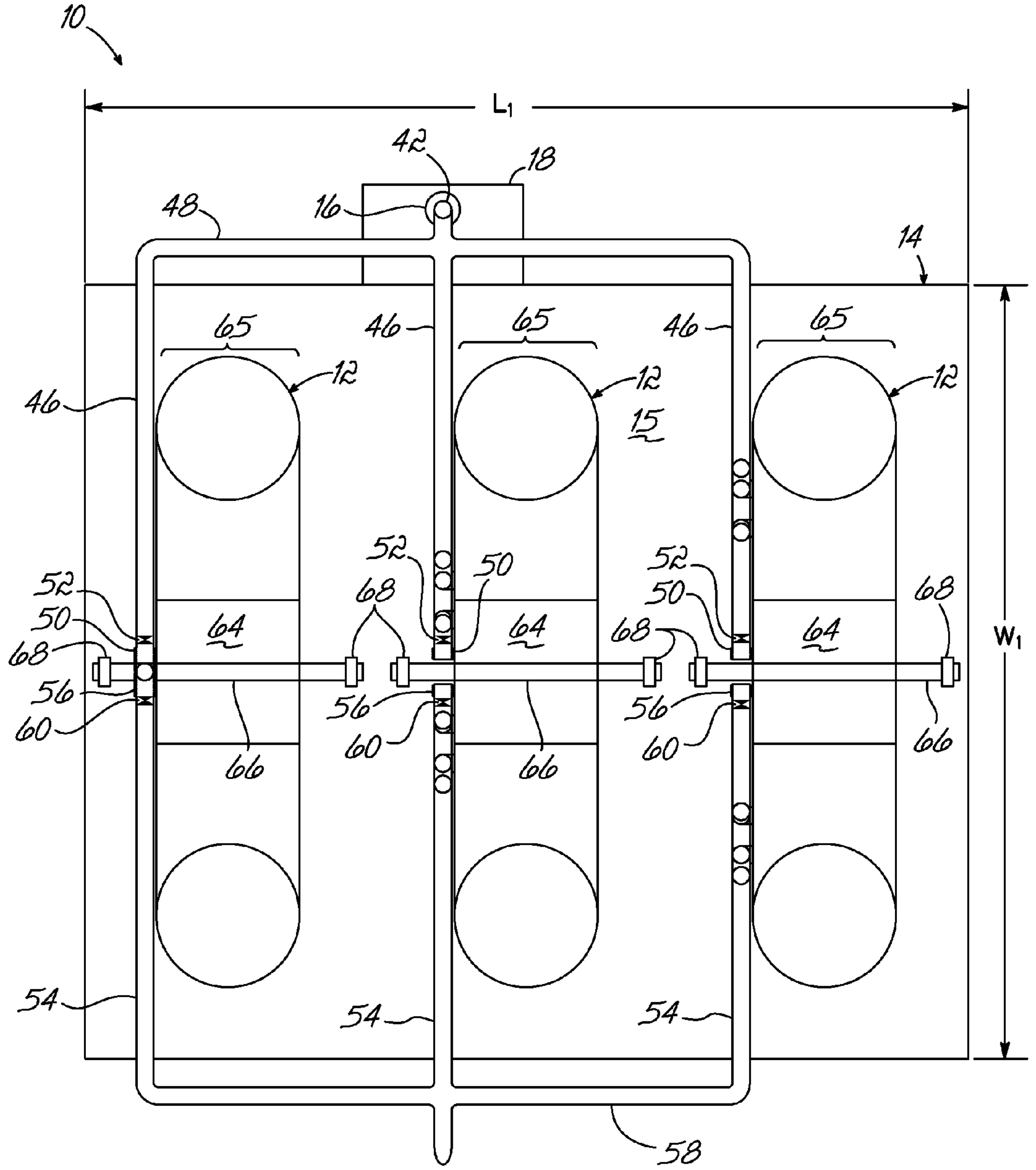
FIG. 14 is a diagrammatic cross-sectional top view of the hydraulic power apparatuses in FIG. 13 illustrating exemplary dimensions of one potential embodiment of the invention.

Referring now to FIGS. 12-14, dimensions and shapes are provided for an exemplary weightless water wheel. The specific dimensions are therefore only for explanatory purposes and not intended to limit the invention in any way. The dimensions used in the exemplary weightless water wheel result in the containment chambers having a volume of about 40,000 cu ft, or 300,000 gals of water. Those having ordinary skill in the art will recognize that any manner of utilizing ballast or resisting pressure to offset the weight of displacement of a volume and area intended to be rotated or altered in position within a body of liquid for receiving discharge from that body of liquid or substitute body with the intent to perform work may be used.

The buoyancy wheel 12 has a diameter D1 of 220 feet and a thickness T1 of 50 feet. The assembly shaft support columns have a height H1 of 135 feet, thereby suspending the buoyancy wheel 12 above the floor of the main reservoir, which has a width W1 of 270 feet, a length L1 of 308 feet, and a height H2 of 265 feet. The containment chambers are formed by sectioning off a part of the buoyancy wheel, which in this example is a cylindrical torrid. This sectioning results in a minimum circumferential dimension C1 of about 10 feet 1 inch, and a maximum circumferential dimension C2 of 29 feet 5.375 inches. The ballast chamber 64 has a diameter of D2 of 50 feet and rotates around an assembly rotation shaft having a diameter D3 of 6 feet. The penstock 42 has a height H3 of 100 feet and a diameter D4 of 6 feet. The ducts 40, 46, 54 and reservoir return header 48 have a diameter D5 of 6 feet, while the containment chamber discharge header 44 has a diameter D6 of 8 feet.

TABLE I

| Weights and Measurements Conversion | |
|---|---|
| 1 cu ft | 7.5 gals of water |
| 1 cu ft | 62.5 lbs. of water |
| 1 Horsepower | 0.746 kw or 33,000 pound-feet/minute |
| 1 Megawatt | 1,341 hp |
| 1 ft. Head of water at 62 F. | 0.433 psi |
| 1 psi | 2.31 ft. head of water at 62° F. |

TABLE II

| Conversion for Head Ft. of Water to Kilowatt Output |
|---|
| (.746 = constant) |
| (Head = psi × 2.31) |
| (cfs = gallon/min/448.831) |
| (T.E. = turbine efficiency) |
| (G.E. = generator efficiency) divided by (8.82) = Kilowatts |

Using the conversion values in tables I and II with the following equation:

0.746×Head×cfs×T.E.×G.E./8.82=output in kilowatts and plugging in the dimensions of the proposed embodiment yield the following results:

100 head feet=43.3 psi at the input to the hydraulic turbine 16;

40,000 cu ft×7.5 gals/cu ft=300,000 gals of capacity in the containment chambers;

300,000 gals/minute divided by 448.831=668.4 cfs; and 0.746×100 ft. of head×668.4 cfs×0.85×0.96÷8.82=4,613 kws or 4.6 mws.

To put the projected output power of the hydraulic turbine in the above example into perspective, 4.6 mws is equivalent to the continuous burning of 46,000 100 watt light bulbs. Reserving 0.6 mws is for auxiliaries such as the rotary drive unit 72 (0.6 mw=804.6 hp) would leave a still substantial 4.0 msw to deliver to the grid. Using 2,000 kw continuous consumption per home, 4.0 mws would be sufficient to supply 2,000 homes with electricity.

A 220' outside diameter wheel has a 691 foot outer circumference, which requires 345.5° of linear travel to rotate 180 degrees. Therefore, at 6 ft/sec linear velocity, the travel time to rotate the aforementioned wheel 180 degrees will be approximately one minute. Thus, using 3 tandem weightless water wheels, each capable of being rotated at a 2 ft/sec linear velocity by the rotary drive, will result in a travel time sufficient to position a full chamber in the uppermost position every minute, thereby providing a continuous flow at the aforementioned output of 300,000 gal/min.

As previously noted, the dimensions, volumes, and shapes used in this presentation are for explanatory purposes only, and not intended to limit embodiments of the invention in any way. Using a wheel of the diameter specified in this presentation, a 100 head ft. of water is obtained at the hydraulic turbine. The containment chamber dimensions specified provide a capacity of 40,000 cu ft or 300,000 gals of water. The larger the diameter of the wheel the greater the head feet, so that a wheel having a diameter of 350' would provide 231 head feet or 100 psi. Using the same containment chamber dimensions in a 350' diameter wheel would thus provide a sufficient pressure and volume of water to generate 10,656 kws or 10.7 gmw.

Figure 18A:
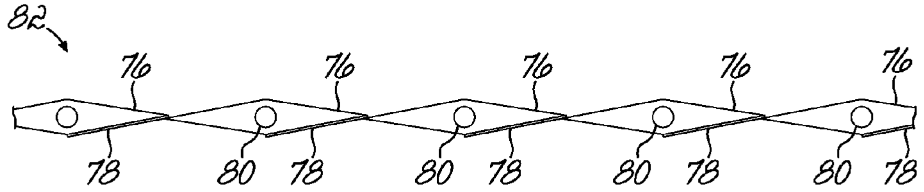
FIG. 18A is a cross-sectional view of the louvered end caps in FIG. 17 showing the louvers in a closed position.
Figure 18B:
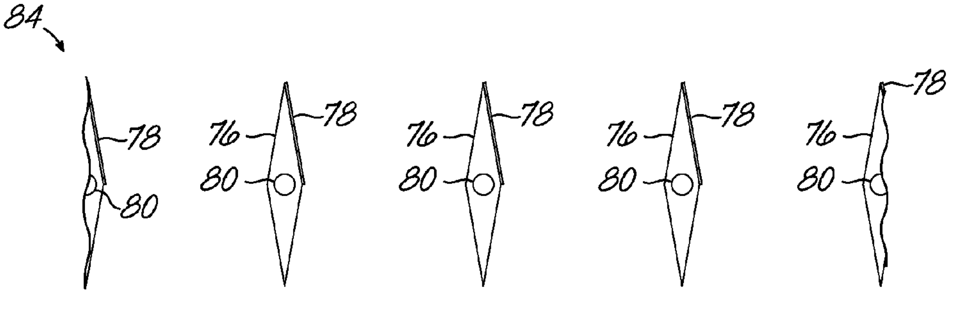
FIG. 18B is a cross-sectional view of the louvered end caps in FIG. 17 showing the louvers in an open position.

Referring now to FIGS. 15-17, 18A and 18B, in which like reference numerals refer to like features in FIGS. 1-14, an alternative embodiment of the weightless water wheel is presented having cylindrically shaped containment chambers 20, 22 and including louvered end caps 74. The louvered end caps 74 include a plurality of individual louvers 76, with each louver including a seal 78 and a shaft 80. The shafts 80 run generally through lengths of the louvers 76 and provide an axis about which each of louvers 76 may be rotated. The louvers 76 are spaced laterally on the end caps 74 at a sufficient distance so that when the louvers 76 are rotated to a closed position, as shown in FIG. 18A, the seal 78 of each louver 76 contacts a facing side of an adjacent louver 76 to form a fluid tight seal. The louvered end caps 74 are thereby configured so that fluids are prevented from passing through the end caps 74 when the louvers 76 are in a closed position. The louvers 76 may also be rotated to an open position, as shown in FIG. 18B. Typically, the louvers 76 are rotated about 90 degrees with respect to their closed position to open the end cap 74, however, other degrees of rotation may be used to open the louvers 76. As will be apparent to those having ordinary skill in the art, the louvers 76 may thereby selectively fluidically couple the interior of the containment chambers 20, 22 to the surrounding environment by being positioned in either an open or closed position. The louvered end caps 74 may be used to expose the entire inside area of the associated containment chamber 20, 22 to the atmosphere of the reservoir 14, thereby providing tighter coupling between the atmosphere of the reservoir and the interior of the containment chambers 20, 22 than the port isolation valves 32, 34, 36, 38 acting alone.

It will be understood that when an element is described as being "connected" or "coupled" to or with another element, it can be directly connected or coupled with the other element or, instead, one or more intervening elements may be present. In contrast, when an element is described as being "directly connected" or "directly coupled" to another element, there are no intervening elements present. When an element is described as being "indirectly connected" or "indirectly coupled" to another element, there is at least one intervening element present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for providing power to a hydraulic turbine, the apparatus comprising:

a main reservoir configured to hold a liquid;

a buoyancy wheel rotatably suspended within the main reservoir, the buoyancy wheel including radially opposed first and second containment chambers configured so that when the buoyancy wheel is rotated into a position where one of the containment chambers is in an uppermost position the other containment chamber is in a lowermost position; and a hydraulic turbine including an input port selectively fluidically coupleable to the containment chamber in the uppermost position, and an output port selectively fluidically coupleable the containment chamber in the lowermost position, wherein fluidically coupling the input and output ports of the hydraulic turbine to the respective containment chambers provides a path through the hydraulic turbine for the liquid to flow from the containment chamber in the uppermost position to the containment chamber in the lowermost position.

2. The apparatus of claim 1 further including an electric generator coupled to the hydraulic turbine.

3. The apparatus of claim 1, wherein the buoyancy wheel further includes a ballast chamber located radially between the first and second containment chambers, the ballast chamber containing ballast having sufficient mass to render the buoyancy wheel neutrally buoyant with respect to the liquid.

4. The apparatus of claim 1, wherein the buoyancy wheel further includes a toroidal chamber sharing an axis with the buoyancy wheel.

5. The apparatus of claim 4, wherein the first and second containment chambers are defined within the toroidal chamber.

6. The apparatus of claim 5, wherein the buoyancy wheel further includes a ballast chamber located radially between the first and second containment chambers, the ballast chamber containing ballast having sufficient mass to render the buoyancy wheel neutrally buoyant with respect to the liquid, and the ballast chamber is coupled to the toroidal chamber so that the ballast chamber and toroidal chamber rotate as a unit.

7. The apparatus of claim 1, wherein the buoyancy wheel is fully submerged in the liquid.

8. The apparatus of claim 1 wherein the first and second containment chambers each include an outside port and an inside port.

9. The apparatus of claim 8 further comprising:

a first extractable/retractable piping;

a second extractable/retractable piping;

a third extractable/retractable piping;

a penstock having an upper end and a lower end, the lower end being fluidically coupled to the input port of the hydraulic turbine;

a containment chamber discharge duct having an input end selectively fluidically coupleable to the inside port of the containment chamber in the uppermost position by the first extractable/retractable piping, and an output end fluidically coupled to the upper end of the penstock;

a hydraulic turbine discharge reservoir configured to accept liquid discharged from the hydraulic turbine;

a hydraulic turbine discharge reservoir return duct having an input end fluidically coupled to the hydraulic turbine discharge reservoir and an output end selectively fluidically coupleable to the outside port of the containment chamber in the lowermost position by the second extractable/retractable piping; and a containment chamber atmospheric vent duct having an input end fluidically coupleable to the inside port of the containment chamber in the lowermost position by the third extractable/retractable piping, and an output end vented to the atmosphere.

10. The apparatus of claim 9 further comprising:

a rotary drive unit coupled to the buoyancy wheel and configured to selectively rotate the buoyancy wheel;

a first outside port isolation valve configured to selectively control flow through the outside port of the first containment chamber;

a first inside port isolation valve configured to selectively control flow through the inside port of the first containment chamber;

a second outside port isolation valve configured to selectively control flow through the outside port of the second containment chamber;

a second inside port isolation valve configured to selectively control flow through the inside port of the second containment chamber;

a containment chamber discharge duct isolation valve configured to selectively control flow though the containment chamber discharge duct;

a hydraulic turbine discharge reservoir return duct isolation valve configured to control flow through the hydraulic turbine discharge reservoir return duct; and a containment chamber atmospheric vent duct isolation valve configured to selectively control flow through the containment chamber atmospheric vent duct.

11. The apparatus of claim 8 wherein the outside ports of the first and second containment chambers are configured to extend above the surface of the liquid in the main reservoir when the associated containment chamber is in the uppermost position.

12. A method of providing liquid flow to a hydraulic turbine, the method comprising:

filling a first containment chamber of a buoyancy wheel including first and second containment chambers with the liquid;

rotating the buoyancy wheel so that the first containment chamber is in an uppermost position and the second containment chamber is in a lowermost position;

causing the liquid to flow from the first containment chamber through the hydraulic turbine and into the second containment chamber.

13. The method of claim 12 wherein the amount of liquid flowing out of the first containment chamber is equal to the amount of liquid flowing into the second containment chamber so that the mass of the buoyancy wheel remains constant as the liquid flows from the first containment chamber into the second containment chamber.

14. The method of claim 12 further comprising:

selectively fluidically coupling an inner port of the first containment chamber to an input port of the hydraulic turbine through a first extractable/retractable piping;

selectively fluidically coupling an outer port of the second containment chamber to an output port of the hydraulic turbine through a second extractable/retractable piping; and selectively fluidically coupling an inner port of the second containment chamber to the atmosphere through a third extractable/retractable piping.

15. The method of claim 12 wherein causing the liquid to flow from the first containment chamber through the hydraulic turbine and into the second containment chamber comprises:

opening outside port isolation valves in the first and second containment chambers; and opening inside port isolation valves in the first and second containment chambers.

16. The method of claim 15 wherein causing the liquid to flow from the first containment chamber through the hydraulic turbine and into the second containment chamber further comprises:

opening a containment chamber discharge duct isolation valve;

opening a hydraulic turbine discharge reservoir return duct isolation valve; and opening a containment chamber atmospheric vent duct isolation valve.

17. The method of claim 12 wherein the buoyancy wheel is neutrally buoyant.

18. The method of claim 12 further comprising:

adjusting the amount of ballast in a ballast chamber so that the buoyancy wheel is neutrally buoyant.

19. The method of claim 12 further comprising:

in response to the liquid from the first chamber having fully transferred into the second chamber:

closing a discharge duct isolation valve;

closing a discharge reservoir return duct isolation valve;

closing an atmospheric duct isolation valve;

retracting a first expandable/retractable piping associated with a containment chamber discharge duct;

retracting a second expandable/retractable piping associated with a hydraulic turbine discharge reservoir return duct; and retracting a third expandable/retractable piping associated with a containment chamber atmospheric vent duct.

20. The method of claim 19 further comprising:

rotating the buoyancy wheel 180 degrees so that the second containment chamber is in the uppermost position and the first containment chamber in the lowermost position.

* * * * *